US005917484A

United States Patent [19]
Mullaney

[11] Patent Number: 5,917,484
[45] Date of Patent: Jun. 29, 1999

[54] MULTILINGUAL SYSTEM LOCALE CONFIGURATION

[75] Inventor: David Mullaney, Fort Collins, Colo.

[73] Assignee: Hewlett-Packard Company, Palo Alto, Calif.

[21] Appl. No.: 08/804,760

[22] Filed: Feb. 24, 1997

[51] Int. Cl.[6] .................................................... G06F 3/14
[52] U.S. Cl. .............................................. 345/333; 704/8
[58] Field of Search ...................................... 345/326, 333, 345/336, 337, 338, 348; 704/4, 8

[56] References Cited

U.S. PATENT DOCUMENTS

| 5,243,519 | 9/1993 | Andrews et al. | 704/8 |
| 5,416,903 | 5/1995 | Malcolm | 345/333 |
| 5,546,304 | 8/1996 | Marschner et al. | 704/4 |
| 5,583,761 | 12/1996 | Chou | 345/326 |
| 5,634,134 | 5/1997 | Kumai et al. | 707/536 |

*Primary Examiner*—Raymond J. Bayerl
*Assistant Examiner*—Cao H. Nguyen

[57] ABSTRACT

Disclosed are computer implemented methods of configuring system locale in a computer system, and apparatus for implementing same. The methods comprise presenting a computer user with a multilingual, yet locale independent, language selection screen. The language selection screen comprises a number of language options, one of which may be selected by the computer user. The language options appear in characters native to their referenced languages. The language selection screen achieves locale independence by generating elements of the screen from saved bitmap images or the like. In this manner, current locale settings (if any) are ignored, and language databases corresponding to specific locales are not accessed. After a user selects a language option, his or her computer system may be configured to reawake in a corresponding locale; or alternatively, he or she may be presented with additional language/locale option screens which depend from the locale corresponding to the user selected language.

17 Claims, 10 Drawing Sheets

MULTILINGUAL SYSTEM LOCALE CONFIGURATION

FIELD OF THE INVENTION

The following description pertains to multilingual system locale configuration, and more specifically, to computer implemented methods and apparatus for configuring system locale in a computer system.

BACKGROUND OF THE INVENTION

As computer manufacturers seek to develop new and expanded international markets for their products, they are faced with the ever increasing problem of "internationalization". That is, how can a computer programmed in one language be configured such that an end user speaking a different language can interface with it?

In the past, little thought has been given to the internationalization of computers. For many years, computer users were merely forced to learn the language in which a computer was programmed (usually English). For some users, this hurdle meant choosing to buy a different computer system, or having to hire a consultant who spoke the computer's language.

In recent years, and largely due to the falling cost per megabyte of computer memory, it has become more common for computer systems to be manufactured with one or more installed language databases. Typically, these language databases are nothing more than libraries of messages saved in a particular language.

In some instances, a computer system is special ordered with a single installed language database corresponding to the language spoken by its purchaser. Alternatively, computer systems can sometimes be ordered with multiple installed language databases. However, while the purchaser of the computer may now have the ability to access his or her language database, he or she must still navigate cryptic codes and/or foreign prompts (i.e., prompts in the computer's system language—usually English) in order to configure and use his or her language database.

It is therefore a primary object of this invention to provide methods and apparatus pertaining to multilingual system locale configuration, where "system locale" is defined as a setting or settings which determine which language database(s) a computer will access.

An additional object of this invention is to provide a system locale configuration interface which shields a user from cryptic codes and foreign prompts.

A further object of this invention is to provide system locale configuration methods and apparatus which enable a manufacturer to produce a single computer system which can be purchased and readily used in a large number of foreign countries and locales.

It is yet another object of this invention to provide a system locale configuration interface which allows a user to remove unused and/or unecessary language databases from his or her computer system, thereby freeing up valuable disk storage space.

SUMMARY OF THE INVENTION

In the achievement of the foregoing objects, the inventor has devised computer implemented methods of configuring system locale in a computer system, and apparatus for implementing same. The methods comprise presenting a computer user with a multilingual, locale independent, language selection screen.

In UNIX, locale settings determine which language database will be accessed for messaging, etc. A locale variable is made up of three parts: language, territory, and code set. Typical locales include:

de_DE.iso88591, fr_FR.iso88591, and fr_CA.iso88591, where abbreviations are used as follows:

de—German

DE—Germany fr—French

FR—France

CA—Canada

The code set "iso88591" is common to many Western European countries. While a system locale may comprise many locale variables, most computers will only process messages and data in response to a single locale value. In UNIX, the processing of most system calls occurs with respect to the locale identified by the LANG variable.

The language selection screen comprises a number of language options, one of which may be selected by the computer user. The language options appear in characters native to their referenced languages. The language selection screen achieves locale independence by generating elements of the screen from saved bitmap images or the like. In this manner, current locale settings (if any) are ignored, and language databases corresponding to specific locales are not accessed.

After a user selects a language option, his or her computer system may be configured to reawake in a corresponding locale, or alternatively, he or she may be presented with additional language/locale option screens which depend from the locale corresponding to the user selected language.

The additional screens may provide for 1) removal of unused or unecessary language databases, 2) selection of a language variant, 3) selection of a default system locale which differs from the temporary locale set in response to a user's language selection, and 4) complex locale configuration (i.e., adjustment of individual locale variables).

Multilingual system locale configuration is particularly beneficial in two situations: 1) upon delivery of a new computer system to its first user, and 2) upon reconfiguration of a computer system for a new user (i.e., upon sale or transfer of a computer system).

For example, a computer system might be configured to generate and display the language selection screen illustrated in FIG. 4 upon its first power up, after purchase by User A. After selecting a language, User A may view the screens of FIGS. 5-8 in his native language as he configures system locale for his computer. If the computer system is then sold to User B, who lives in a country foreign to User A, User A can reinvoke the process which generates and displays the FIG. 4 language selection screen, and configure system locale for User B while viewing the screens of FIGS. 5-8 in his own locale. The language selected by User A, which determines the locale of subsequent configuration screens, does not have to coincide with the computer system's ultimate default locale!

By using the interface disclosed herein, a computer user is shielded from 1) typing in cryptic codes for locale values, 2) the details of coordinating locale settings, and 3) the syntax of system (i.e., UNIX) commands.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 1:
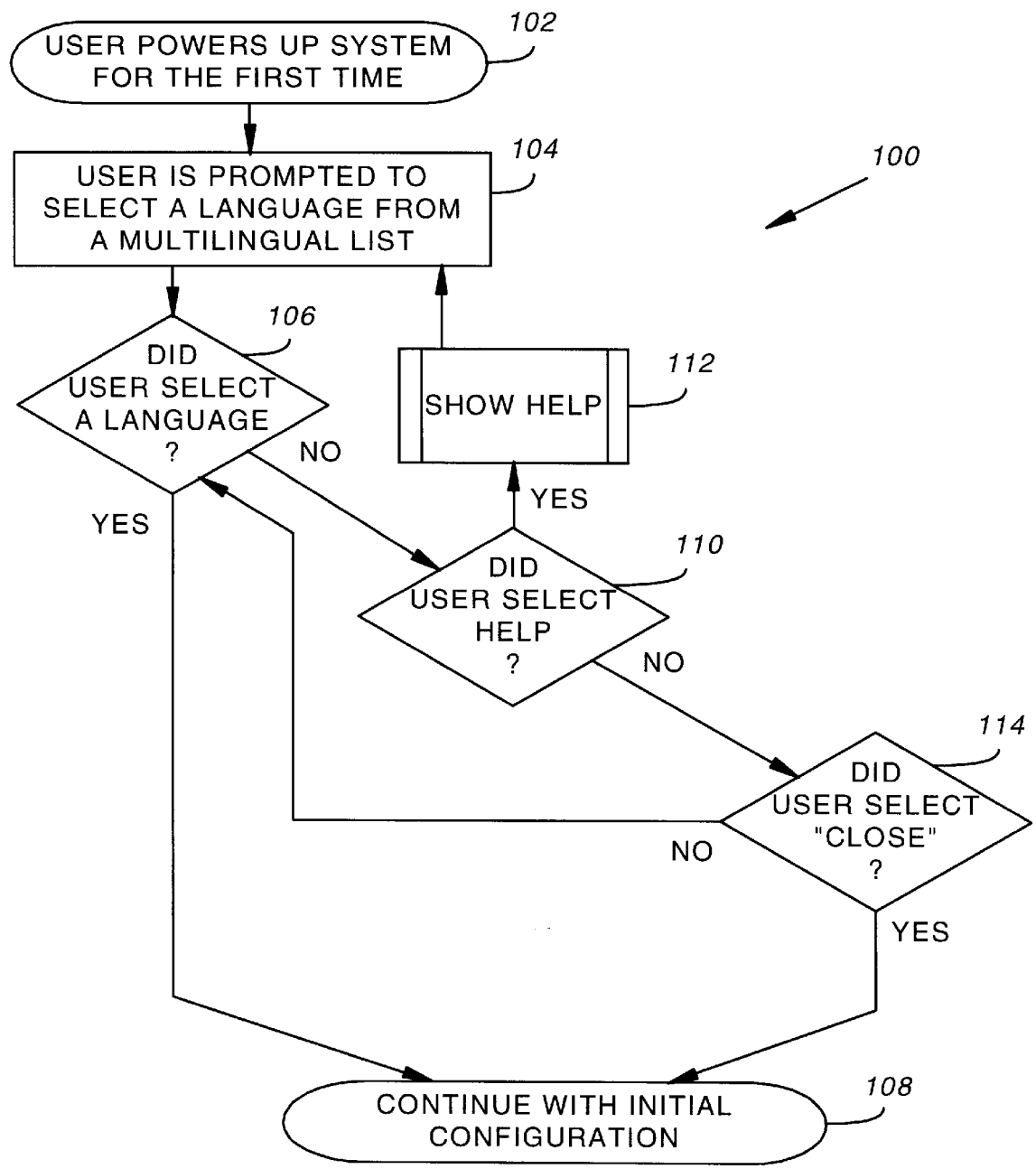
FIG. 1 is a flow chart illustrating a first embodiment of multilingual system locale configuration.
Figure 2:
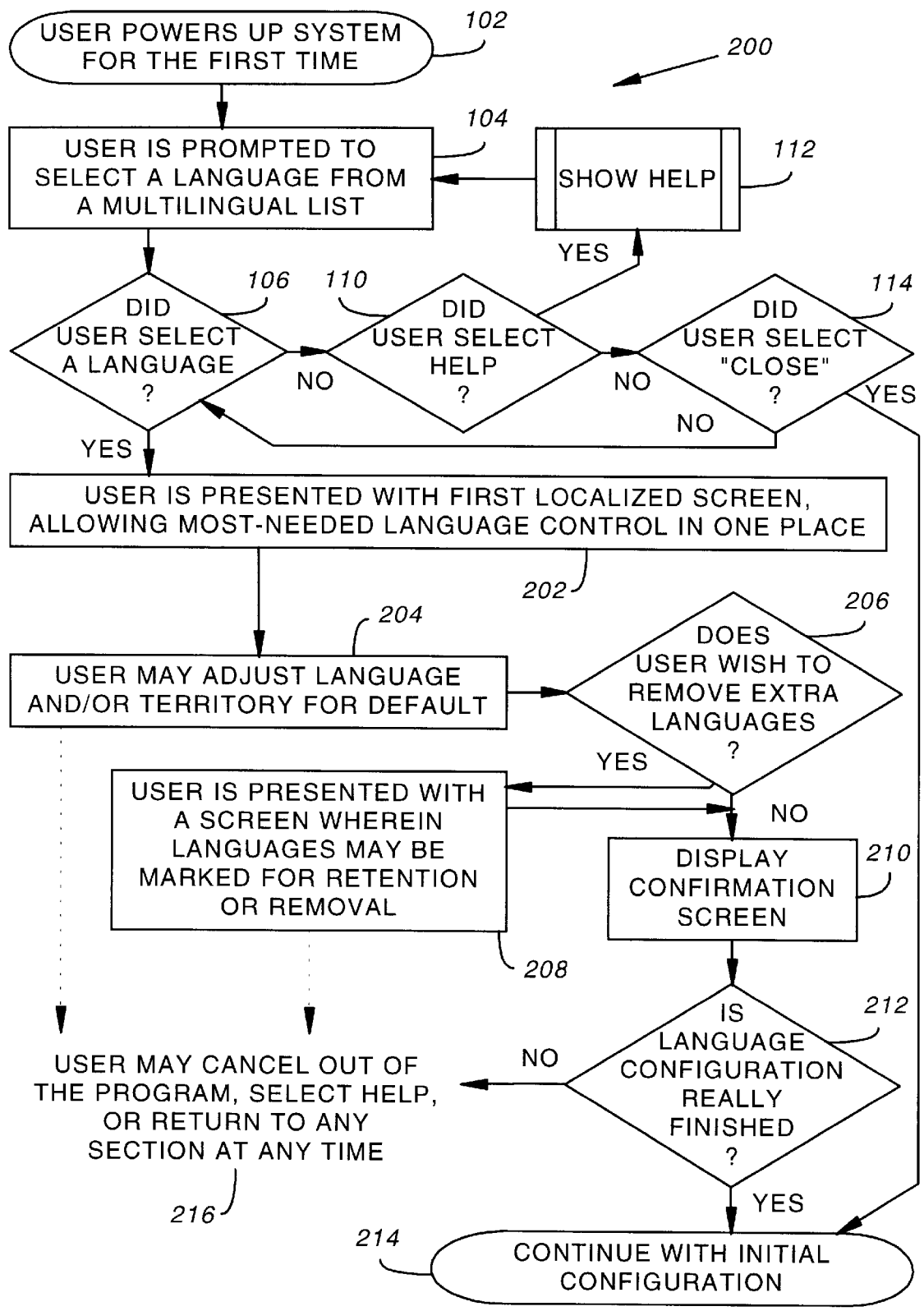
FIG. 2 is a flow chart illustrating a second embodiment of multilingual system locale configuration.
Figure 3:
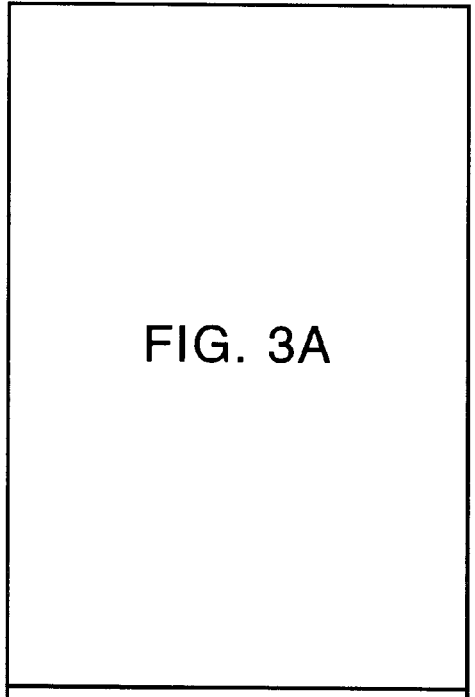
FIG. 3 (including subparts 3A and 3B) is a flow chart illustrating a third embodiment of multilingual system locale configuration.
Figure 3:
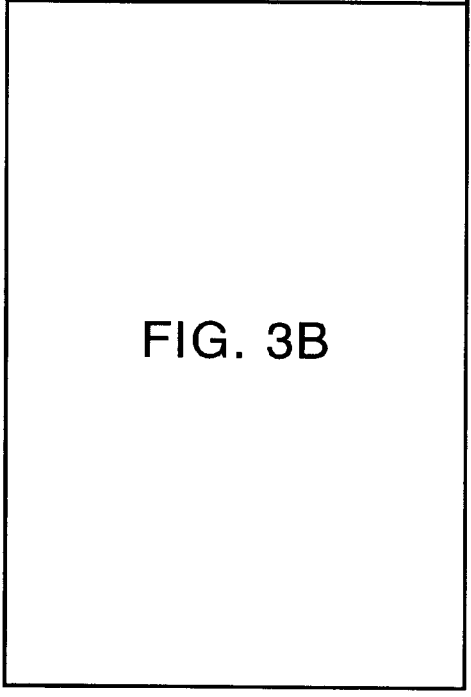
Figure 3A:
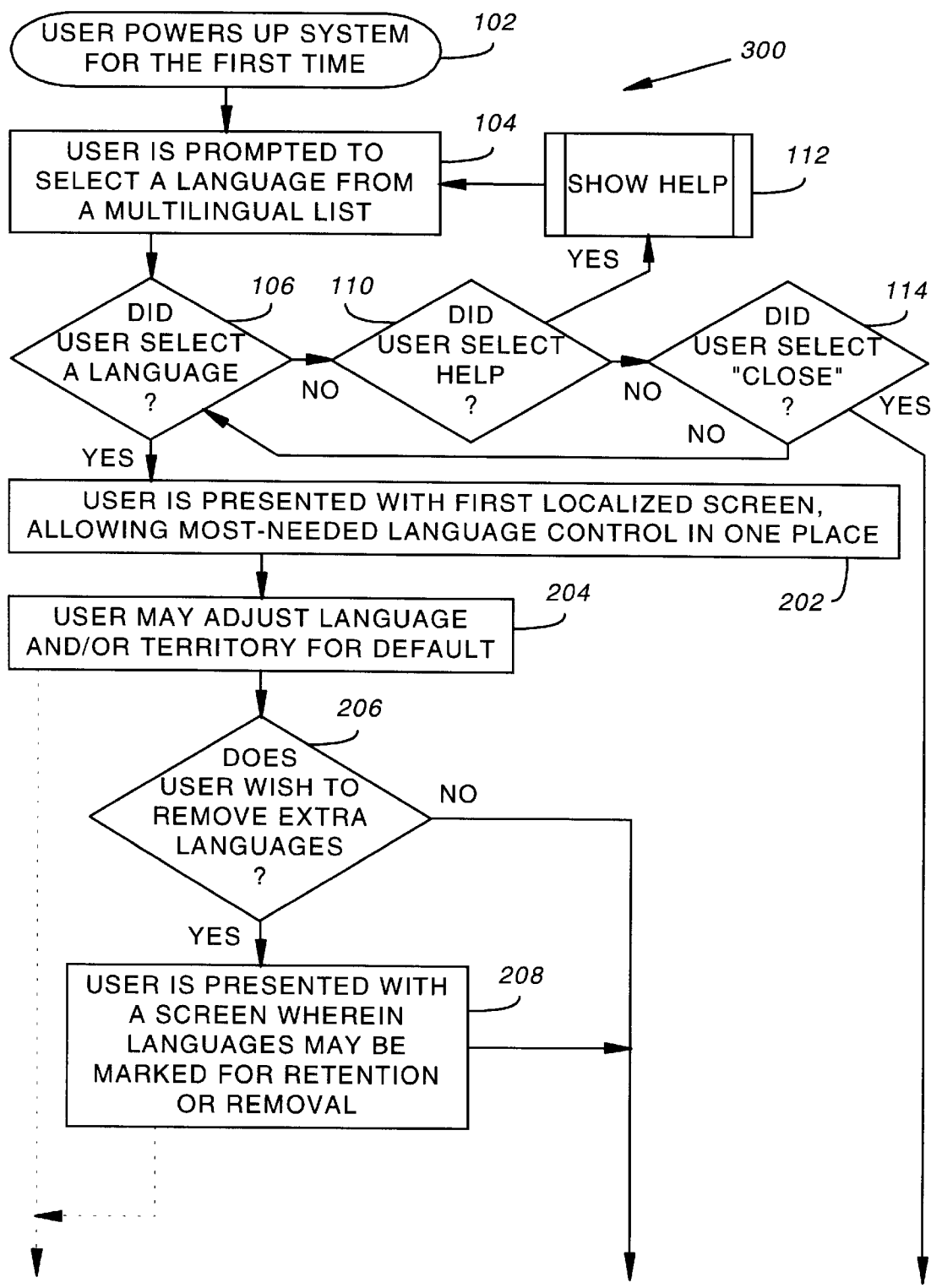
Figure 3B:
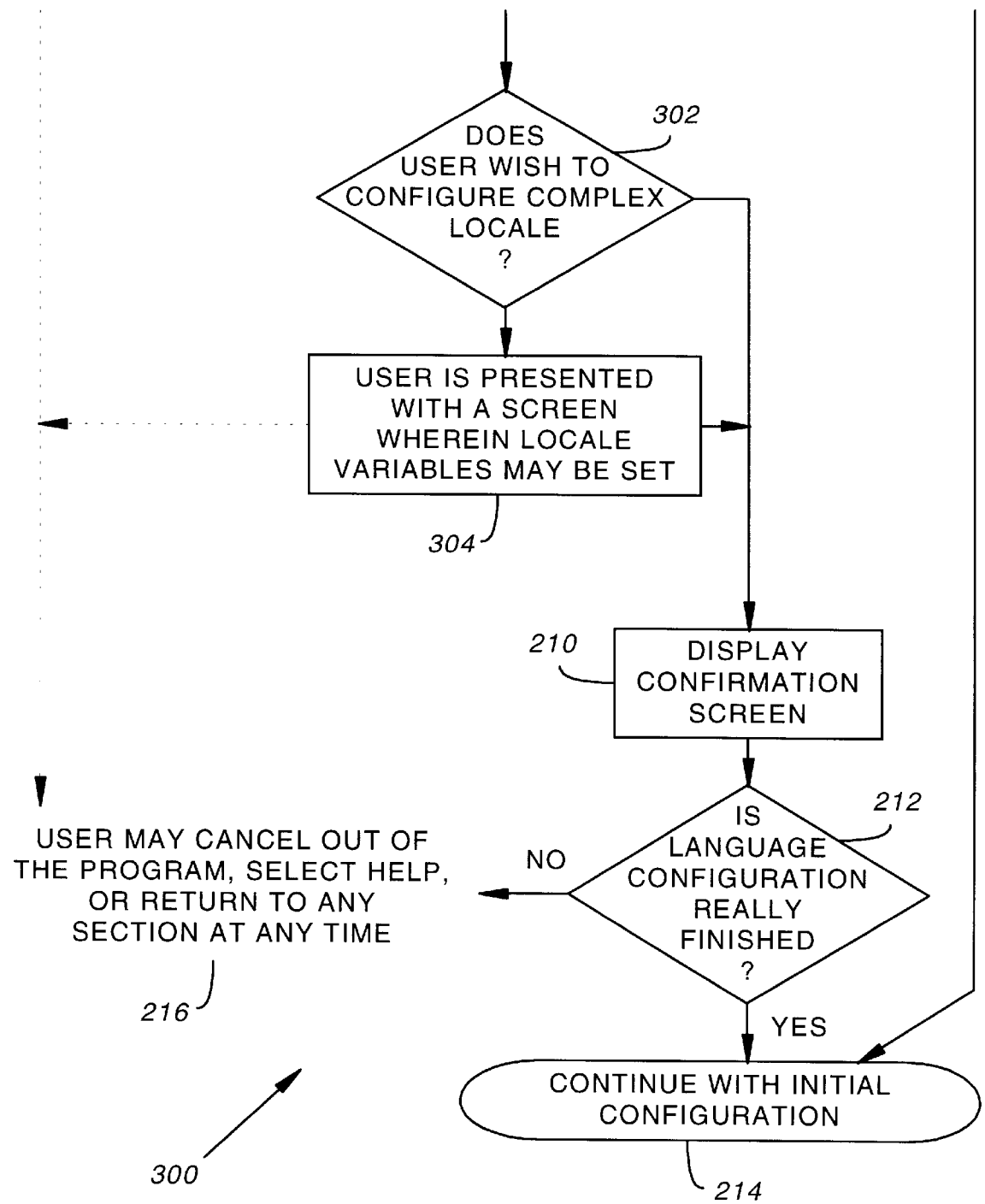

A computer implemented method 100 of configuring system locale in a computer system is illustrated in FIG. 1, and may generally comprise the steps of 1) presenting 104 a computer user with a language selection screen 400 composed of locale independent data 402–420, and 2) in response to a language selected by the computer user, configuring 108 the computer system to awake, upon restart, in a locale corresponding to the user selected language.

Alternatively, the method 200, 300 may generally comprise the steps of 1) presenting 104 a computer user with a language selection screen 400 composed of locale independent data 402–420, and 2) in response to a language selected by the computer user, displaying 202, 208, 210, 304 one or more additional screens 500, 600, 700, 800 comprising locale dependent data 502, 602, 702, 802 to the computer user. In this alternate embodiment of the method 200, 300, the one or more additional screens 500, 600, 700, 800 depend upon a locale which corresponds to the user selected language. The additional screens 500, 600, 700, 800 also comprise a locale selection screen 500. The method 200, 300 concludes when in response to a locale selected by the computer user, the computer system is configured 214, 306 to awake, upon restart, in the selected locale.

In conformance with the above methods 100, 200, 300, apparatus for configuring system locale in a computer system may generally comprise one or more computer readable storage mediums, and computer readable program code stored in the one or more computer readable storage mediums. A first portion of the computer readable program code presents 104 a computer user with a language selection screen 100 composed of locale independent data 402–420. A second portion of the code displays 202, 208, 210, 304 one or more additional screens 500, 600, 700, 800 comprising locale dependent data 502, 602, 702, 802 to the computer user, in response to a language he or she selects from the language selection screen. The second portion of code is configured such that the locale of the one or more additional screens 500, 600, 700, 800 corresponds to the user selected language. Preferably, one of the additional screens 500, 600, 700, 800 is a locale selection screen 500. A third portion of the code configures 214, 306 the computer system to awake, upon restart, in the locale selected by the computer user.

Having described methods 100, 200, 300 and apparatus for configuring system locale in a computer system in general, the methods 100, 200, 300 and apparatus will now be described in further detail.

Figure 4:
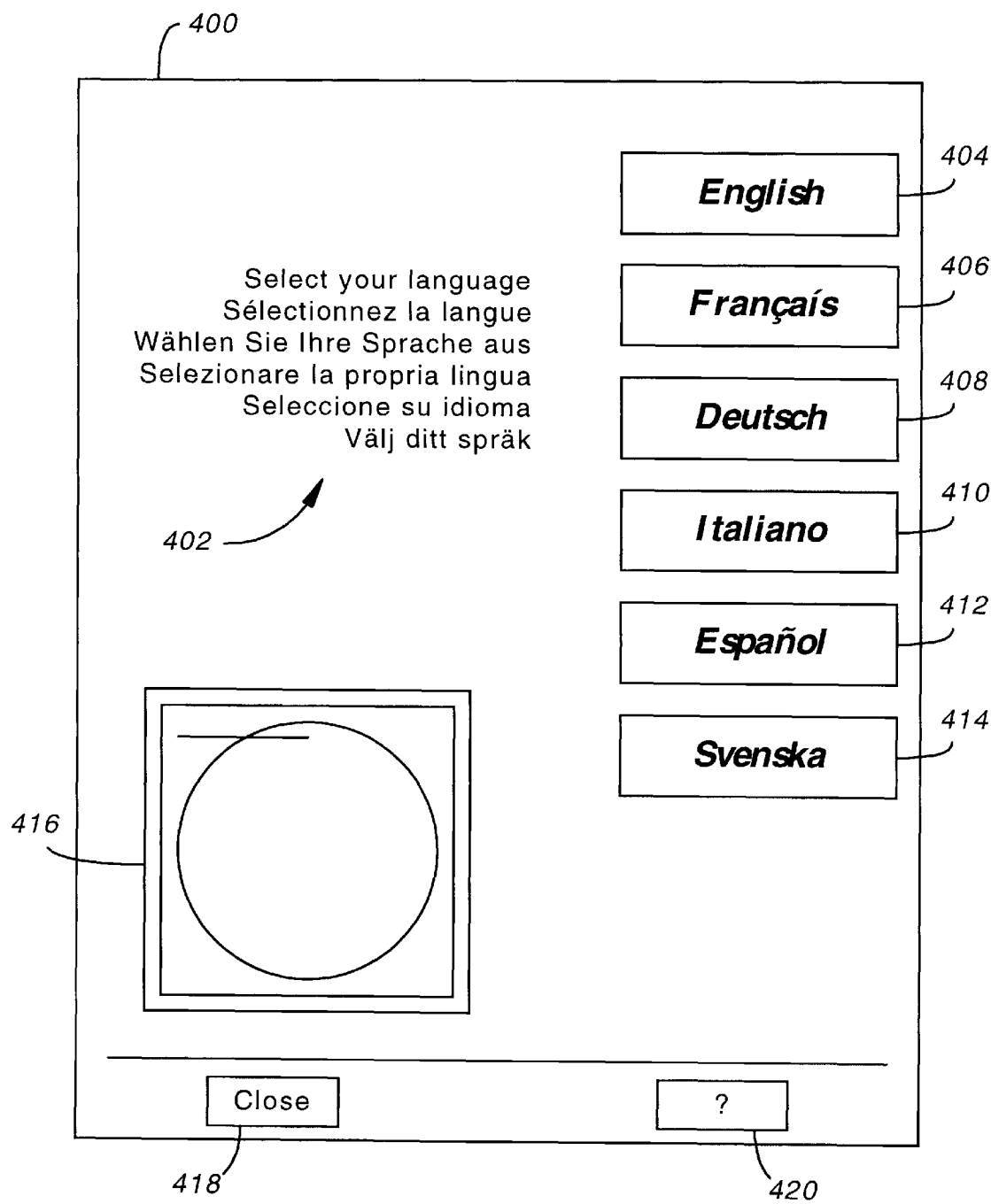
FIG. 4 is a preferred implementation of the language selection screen presented to a computer user during the execution of any of the methods illustrated in FIGS. 1–3.

In all of the above methods 100, 200, 300 and/or apparatus, a computer user is first presented 104 with a language selection screen 400 composed of locale independent data 402–420. A representative language selection screen 400 is illustrated in FIG. 4 and comprises six language selections: English, Francais, Deutsch, Italiano, Espa ̱nol and Svenska.

On the upper left hand side of the screen 400, the instruction "Select your language" 402 appears in each available language selection. Language pushbuttons 404–414 corresponding to these instructions 402 appear on the right hand side of the screen 400. Also appearing on the screen 400 are "Close" and Help ("?") pushbuttons 418, 420 should a user wish to 1) abort system locale configuration, or 2) inquire about system locale configuration prior to making a language selection. A logo, background art, or other graphical indicia 416 might also appear on the screen 400.

To circumvent the problem of displaying multiple fonts within a single screen, it is preferred that the elements 402–420 of the language selection screen 400 comprise stored bitmaps or the like. In this manner, each instruction 402 and pushbutton 404–414, 418, 420 may easily be configured to appear in a computer user's native language and character set.

Since the instructions 402 and logo 416 do not comprise selectable prompts (i.e., pushbuttons), one or more of these items may be stored as a single bitmap for ease of retrieval.

Although FIG. 4 is illustrative of a pushbutton selection screen 400, wherein a user makes a language selection by navigating a graphical pointer over a pushbutton 404–414 and clicking with a mouse, keyboard or the like, the pushbuttons 404–414, 418, 420 could easily be replaced with checkboxes or other selectable prompts.

The language selection screen 400 of FIG. 4 is a graphical user interface (GUI). Alternatively, the GUI language selection screen 400 could be replaced with a terminal user interface (TUI) language selection screen. In a TUI, the ability to display information other than text is greatly limited. As earlier stated, it is also difficult to display characters of multiple character sets in a single screen. It is therefore preferred that language options be displayed in capital ASCII letters. Most languages names (other than Asian languages) can be correctly displayed in ASCII letters, whereas other character sets are too specialized. Capital ASCII letters are preferred to lowercase ASCII letters in that lowercase ASCII letters do not provide the tildas and/or other special characters often associated with the lowercase letters of a written language.

Note that the above described language selection screens 400 are locale independent. Regardless of any current locale settings, the process which causes the language selection screen 400 to be displayed (e.g., compiled C++ code) assumes that system locale is as yet undetermined. A user viewing a language selection screen 400 as described above may therefore configure system locale in his or her own native language, without having to process foreign instructional materials and/or prompts.

Preferably, a user gets to the language selection screen 400 in one of two ways—1) by entering an appropriate command to initiate the system locale configuration process, or 2) automatically, upon powering up a computer system 102.

Although language selection is believed to be self-explanatory, a user may select 106, 110, 112 help ("?") if he or she so desires. Since the language selection screen 400 assumes an unknown locale, help text will necessarily be displayed in the language used by system code, or in some other predetermined language.

Note that a user may exit system locale configuration 100, 200, 300 from any screen 400, 500, 600, 700, 800 disclosed herein by selecting 106, 114 "Close" 418 or "Cancel" 514.

After a user chooses a language from the language selection screen 400, a first embodiment of system locale configuration 100 configures 108 the computer system to awake, upon restart, in a locale corresponding to the user selected language. In UNIX, this is accomplished by setting the LANG and dtlogin*language variables in accordance with the user selected language. Restarting of the computer can be invoked either automatically or manually.

In alternative embodiments of system locale configuration 200, 300, a user is displayed 202, 208, 210 one or more additional screens 500, 600, 700, 800 in response to his or her language selection. The additional screens 500, 600, 700, 800 are locale dependent, and correspond to the language selected by the user. In UNIX, the additional screens may be accessed by temporarily setting the LANG and LC_ALL variables in accordance with the user selected language. Additional screens 500, 600, 700, 800 are then retrieved from an appropriate language database, and allow a user to further customize system locale.

Figure 5:
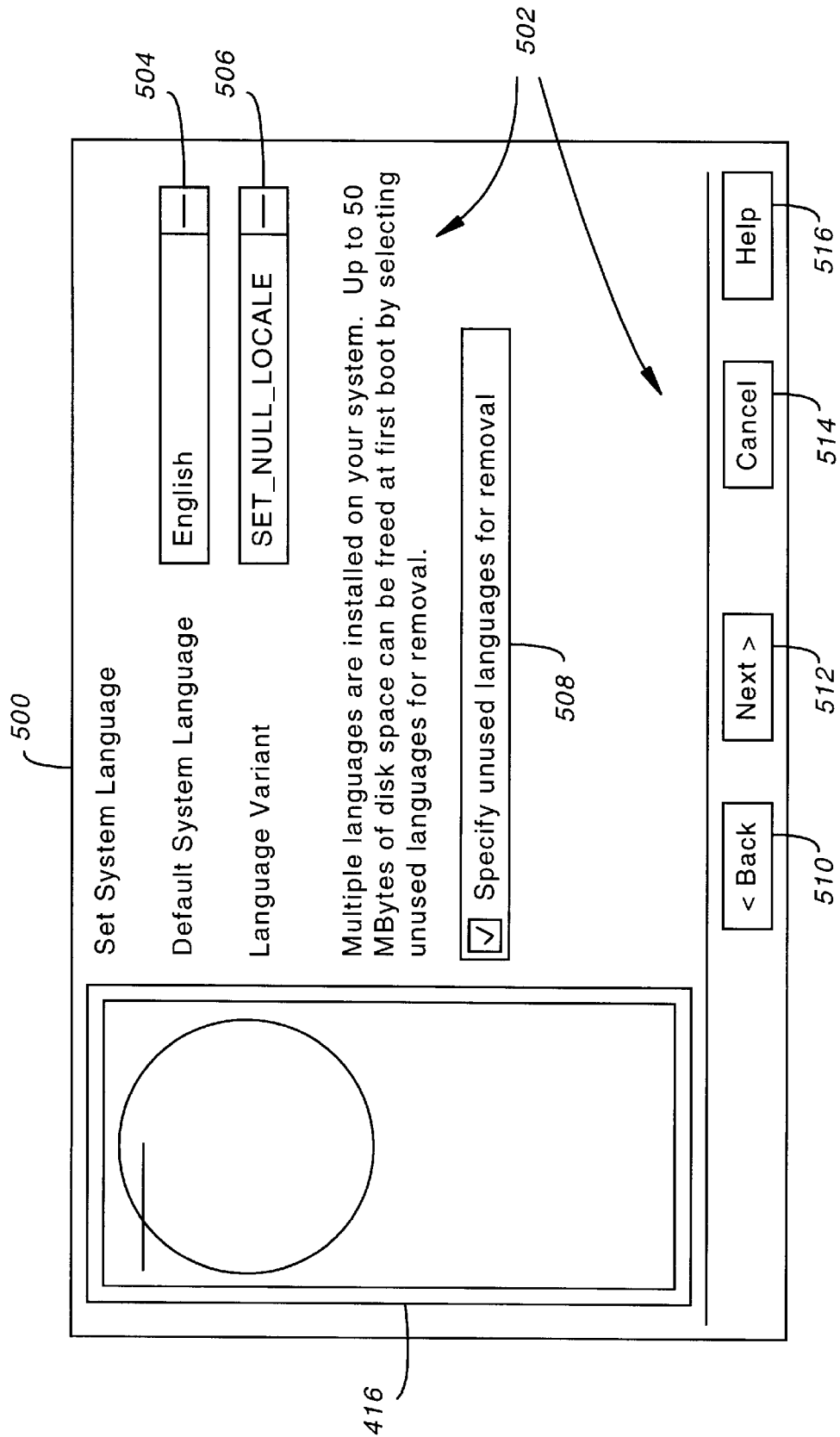
FIG. 5 is a preferred implementation of the locale selection screen presented to a computer user during the execution of the methods illustrated in FIGS. 2 and 3.

A first of the additional screens 500, 600, 700, 800 might be a locale selection screen 500. A representative locale selection screen 500 is illustrated in FIG. 5. In this screen 500, a user is allowed to specify 204 a default locale 504 which differs from the temporary or general locale set in response to his or her language selection. In this manner, for example, an English speaking computer user could easily configure a computer system for a French computer user, yet perform the configuration in his or her own native English language.

The locale selection screen 500 may further provide for selecting 204 a language variant 506. Many language databases comprise language variants such as fr_FR.iso88591 and fr_CA.iso88591, two variants of the French language database. If a language database comprises no variants, the ability to select a variant may be disabled so as to avoid confusion.

Although not illustrated in the drawings, a locale selection screen 500 might further comprise a means of selecting a language code set. The goal of the locale selection screen 500 is to provide most-needed language controls in one place.

Figure 6:
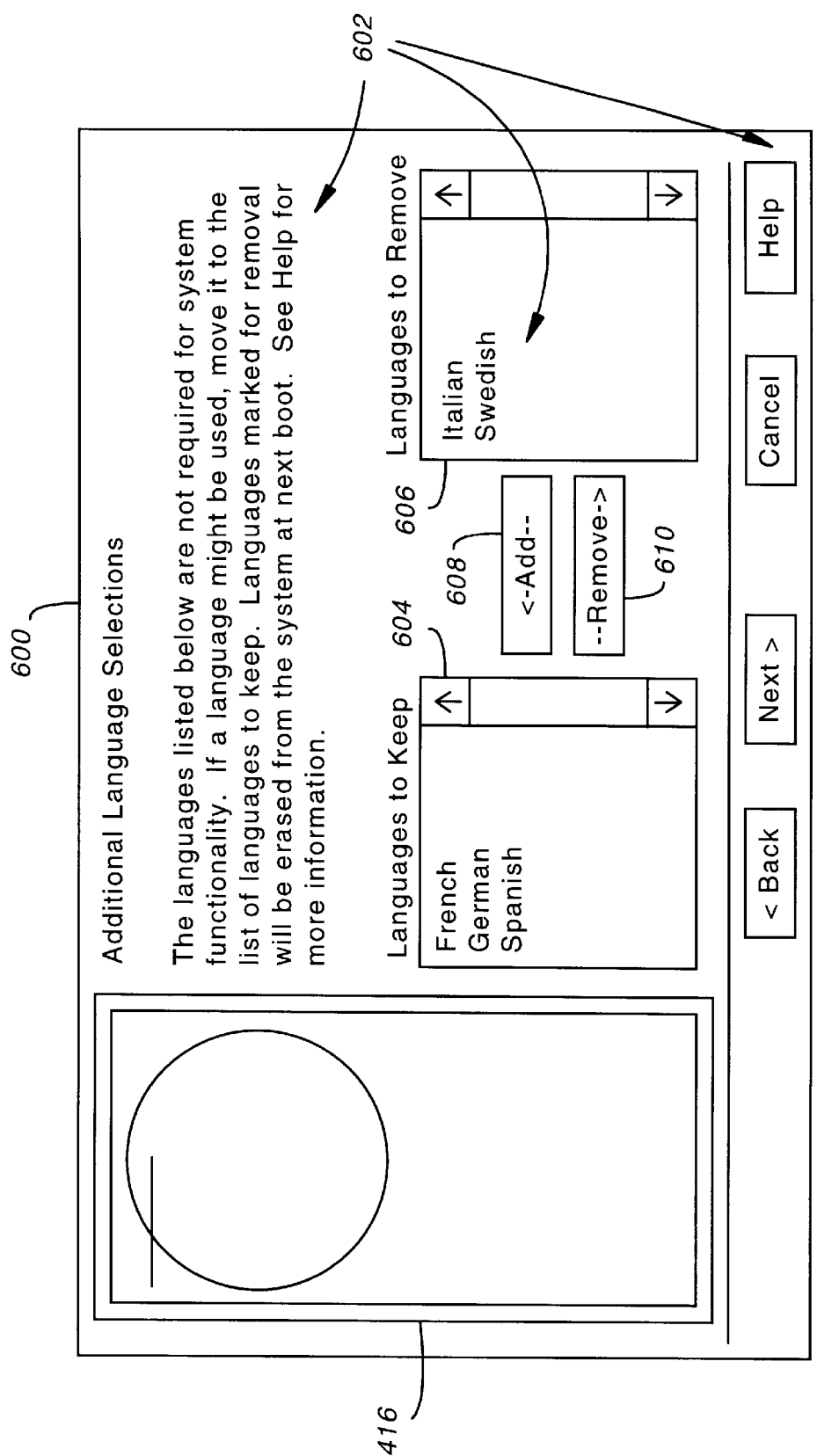
FIG. 6 is a preferred implementation of the language database removal screen presented to a computer user during the execution of the methods illustrated in FIGS. 2 and 3.
Figure 7:
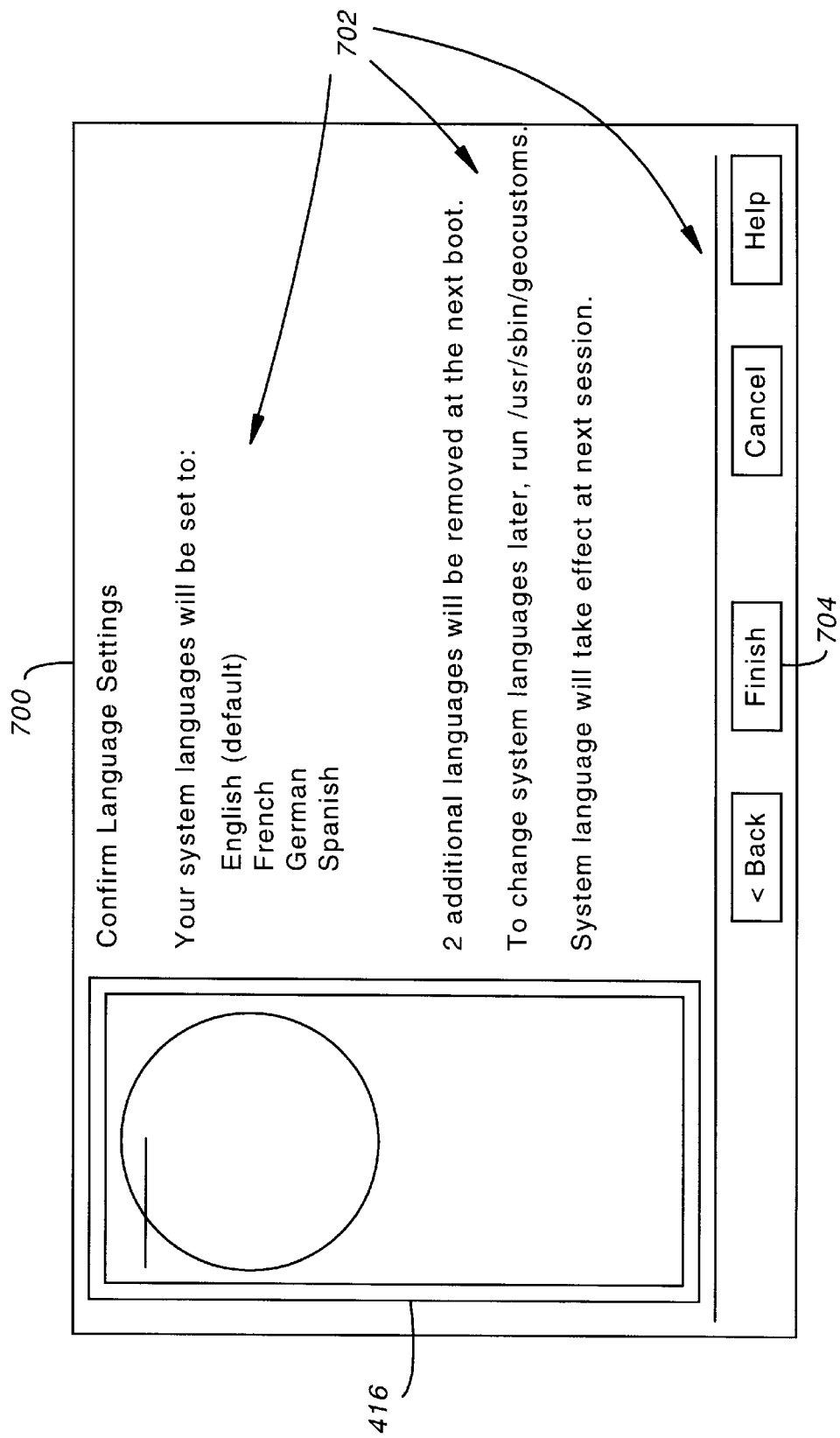
FIG. 7 is a preferred implementation of the language confirmation screen presented to a computer user during the execution of the methods illustrated in FIGS. 2 and 3.

A second of the additional screens 500, 600, 700, 800 might be a language database removal screen 600, as illustrated in FIG. 6. This screen 600 allows a user to remove 206 unused and/or unecessary language databases from his or her computer system. Since language databases may occupy 10–50 Megabytes of space of computer memory, it is highly desirable to remove databases that will never be used.

It is envisioned that the language database removal screen 600 might someday provide for the removal of language variants. However, current standards dictate that language variants be stored as an integral part of their associated language database, and as a result, they cannot be selectively removed. As preferably implemented, a user is allowed to opt 206 for language database removal by clicking a checkbox 508 in the locale selection screen 500 (See FIG. 5). The language database removal screen 600 is thereby avoided if a user only wishes to use system locale configuration for setting a single default locale.

The language database removal screen 600 is preferably implemented as a dual transfer list 604, 606. In FIG. 6, languages to keep are listed in the left-hand list 604, and languages to remove are listed in the right-hand list 606. A list of language databases residing on a computer system may be generated by querying the system. By default, all languages which are not accessed by the user selected system locale will preferably reside in the "remove" list. A user may specify languages to keep by moving a graphical pointer over the language to retain, selecting the language, and then clicking on the "Add" pushbutton 608 (and vice versa using the "Remove" pushbutton 610).

Upon selecting a default locale 204 or specifying languages for removal 208 (depending upon the user's selections in the locale selection screen 500), a second embodiment of system locale configuration 200 may conclude with reconfiguration 214 of the computer as per the user's selections, or alternatively, with displaying 210 a language confirmation screen 700 prior to reconfiguration 214. Preferably, a check 212 is performed to determine whether a language or languages used by system code are marked for removal. System languages may not be removed, or a computer may fail upon reboot. Alternatively to performing a system language removal check 212 subsequent to display 208 of the language database removal screen 600, computer code may be configured such that a system language check is performed prior to display of the language database removal screen 600. In this manner, languages used by system code may be preempted from appearing in the transfer lists of the language database removal screen 600. If system languages do not appear for removal, a user does not have to worry about making an inadvertent removal selection. An important goal in developing methods 100, 200, 300 and apparatus for multilingual system locale configuration was to eliminate chances for a potentially novice user to err.

Prior to restarting the computer (and whether restart is performed automatically or manually), selected language databases may automatically be removed with the UNIX swremove command, and locale variables may be permanently set to coincide with the specified locale. If a language confirmation screen 700 is displayed, variables may be set (and languages removed) upon a user selecting "Finish" 704.

In the above described embodiment of system locale management, it is presumed that the user will be operating in a single locale. However, it is possible that a user may wish to operate in a locale which draws from more than one language database. For example, the UNIX operating system allows for individual adjustment of eight locale variables. These variables comprise: LANG, LC_MESSAGES, LC_NUMERIC, LC_MONETARY, LC_TIME, LC_CTYPE, LC_COLLATE, and LC_ALL. While LANG controls most system calls, LC_MESSAGES may control translation; LC_NUMERIC controls number processing; LC_MONETARY controls currency representation; LC_TIME customizes the display of time and date; LC_CTYPE establishes character type; LC_COLLATE controls ordering lines of text; and finally, LC_ALL overrides all of the other variables.

Figure 8:
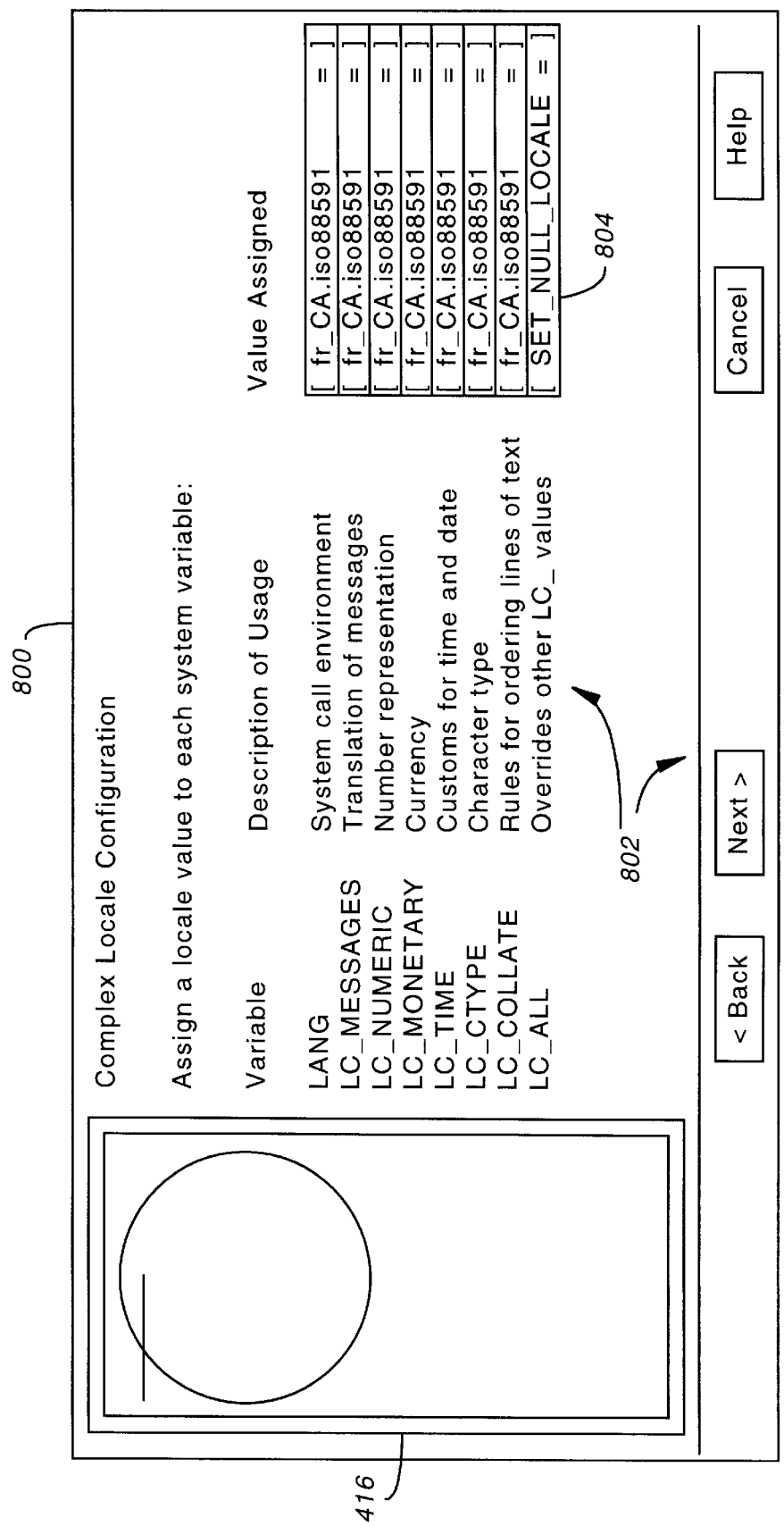
FIG. 8 is a preferred implementation of the complex locale configuration screen presented to a computer user during the execution of the method illustrated in FIG. 3.

Although UNIX Common Desktop Environment (CDE) standards do not currently condone individual adjustment of locale variables, such an adjustment may be become commonplace with the increased internationalization of computer systems. If such is the case, one of the locale dependent screens 500, 600, 700, 800 presented to a user might be a complex locale configuration screen 800, as shown in FIG. 8. A complex locale configuration screen 800 could be implemented in many ways. As with the language database removal screen 600, a prompt for accessing the complex locale selection screen 800 might appear at the bottom of the locale selection screen 500 (FIG. 5). In the complex locale configuration screen 800, each locale variable may preferably be selected from the screen's right-most list 804, and changed by selecting a new value from a pop-up list. By default, each of the variables may be set to the default system locale and language variant already selected by the computer user in earlier screens 400, 500.

If complex locale configuration is allowed, program code should perform a check to determine whether a complex locale is sensible and safe. Certain combinations of locales may not be supported, and configuration of such a locale could lead to unexpected results and possible data corruption.

To navigate 216 among the above screens, "Back" 510 and "Next" 512 prompts may be provided on each screen 500, 600, 800. The final screen (most likely the language confirmation screen 700) may have a "Finish" prompt 704 in lieu of a "Next" prompt 512. A user should also be allowed to cancel 216 out of system locale configuration at any time.

The above described methods 100, 200, 300 and apparatus may be invoked automatically (e.g., upon boot) or manually. If invoked automatically within a UNIX environment, a command to invoke the process which displays the language selection screen 400 may be placed in the /usr/sbin directory.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer implemented method of configuring system locale in a computer system, comprising the steps of:
   a) presenting a computer user with a language selection screen composed of locale independent data, wherein the locale independent data comprises language option graphics retrieved from a computer memory, and each language option graphic references a different language and is presented in characters and/or symbols native to its referenced language; and
   b) in response to a language selected by the computer user, configuring the computer system to awake, upon restart, in a locale corresponding to the user selected language.

2. A computer implemented method as in claim 1, wherein the number of language option graphics are bitmaps.

3. A computer implemented method as in claim 1, wherein the step of presenting a computer user with a language selection screen composed of locale independent data comprises displaying a number of language options in text form.

4. A computer implemented method as in claim 1, wherein the step of presenting a computer user with a language selection screen composed of locale independent data comprises generating a number of pushbuttons on a computer display and allowing the computer user to select only one of the pushbuttons.

5. A computer implemented method as in claim 1, wherein the step of presenting a computer user with a language selection screen composed of locale independent data comprises generating a number of check boxes on a computer display and allowing the computer user to check only one of the check boxes.

6. A computer implemented method of configuring system locale in a computer system, comprising the steps of:
   a) presenting a computer user with a language selection screen composed of locale independent data, wherein the locale independent data comprises language option graphics retrieved from a computer memory, and each language option graphic references a different language and is presented in characters and/or symbols native to its referenced language;
   b) in response to a language selected by the computer user, displaying one or more additional screens comprising locale dependent data to the computer user, wherein the locale of the one or more additional screens corresponds to the user selected language, and the one or more additional screens comprise a locale selection screen; and
   c) in response to a locale selected by the computer user, configuring the computer system to awake, upon restart, in the selected locale.

7. A computer implemented method as in claim 6, wherein:
   a) the display of one or more additional screens comprising locale dependent data comprises the step of displaying a language database removal screen; and
   b) the method comprises the further step of configuring the computer system to remove selected language databases from the computer system.

8. A computer implemented method as in claim 7, further comprising the step of insuring that a language database accessed by system code is not removed.

9. A computer implemented method as in claim 6, wherein:
   a) the display of one or more additional screens comprising locale dependent data comprises the step of displaying a complex locale configuration screen; and
   b) the selected locale in which the computer system awakes upon restart is determined by locale variable settings selected by the computer user.

10. A computer implemented method as in claim 9, further comprising the step of checking to determine whether the user selected locale variables are sensible and safe.

11. A computer implemented method as in claim 6, wherein the step of displaying one or more additional screens comprising locale dependent data to the computer user comprises accessing a language database corresponding to the user selected language.

12. Apparatus for configuring system locale in a computer system, comprising:
   a) one or more computer readable storage mediums; and
   b) computer readable program code stored in the one or more computer readable storage mediums, the computer readable program code comprising:
      i) code for presenting a computer user with a language selection screen composed of locale independent data, wherein the locale independent data comprises language option graphics retrieved from the one or more computer readable storage mediums, and each language option graphic references a different language and is presented in characters and/or symbols native to its referenced language;

ii) code for displaying one or more additional screens comprising locale dependent data to the computer user, in response to a language selected by the computer user, wherein the locale of the one or more additional screens corresponds to the user selected language, and the one or more additional screens comprise a locale selection screen; and iii) code for configuring the computer system to awake, upon restart, in the locale selected by the computer user.

13. Apparatus as in claim 12, wherein the language option graphics comprise a number of bitmaps stored in the one or more computer readable storage mediums.

14. Apparatus as in claim 12, further comprising a number of language databases stored in the computer readable storage mediums, wherein the code for displaying one or more additional screens comprising locale dependent data to the computer user is configured to access one or more of the language databases.

15. Apparatus as in claim 12, wherein the code for configuring the computer system to awake, upon restart, in the locale selected by the computer user, is configured to access at least one language database which differs from the one or more language databases accessed by the code for displaying one or more additional screens comprising locale dependent data to the computer user.

16. A computer implemented method of configuring a computer to operate in a user's native language, comprising the steps of:

a) upon the user's first powering up of the computer, initiating a first, locale independent process which displays a number of selectable language options to the user, wherein each language option references a different language and comprises characters and/or symbols native to its referenced language;

b) upon the user's selection of a language option, initiating a second process with the computer's locale values set temporarily to those corresponding to the user selected language option;

c) from within the second process, prompting the user to specify a default language for the computer; and d) upon the user's next and subsequent powerings up of the computer, insuring that the computer's locale values are set to those corresponding to the user selected default language.

17. A computer implemented method as in claim 16, wherein upon each powering up of the computer subsequent to the first, the user is allowed to reinvoke the first, locale independent process.

* * * * *